July 27, 1954     S. M. MERCIER     2,684,749
MECHANISM FOR INDICATING THE POSITION OF A SHAFT
Original Filed Oct. 3, 1946     2 Sheets-Sheet 1

INVENTOR;
STANLEY M. MERCIER,
BY

ATT'Y.

July 27, 1954

S. M. MERCIER 2,684,749

MECHANISM FOR INDICATING THE POSITION OF A SHAFT

Original Filed Oct. 3, 1946

INVENTOR;
STANLEY M. MERCIER,
BY

ATT'Y.

Patented July 27, 1954

2,684,749

UNITED STATES PATENT OFFICE 2,684,749

MECHANISM FOR INDICATING THE POSITION OF A SHAFT

Stanley M. Mercier, Bexley, Ohio, assignor to The Jeffrey Manufacturing Company, a corporation of Ohio Original application October 3, 1946, Serial No. 700,928. Divided and this application December 21, 1950, Serial No. 201,948

2 Claims. (Cl. 198—40)

This invention relates to mechanism for indicating the position of a shaft and/or blowing-out and lubricating the bearing therefor which may be employed with particular advantage in machinery such as conveyers, elevators, and the like, wherein the shaft and bearings operate in, or are exposed to, heat and dust, or either.

An object of the invention is, therefore, to provide an improved mechanism of the type set forth above.

Another object of the invention is to provide improved mechanism by which the bearings for a shaft of a conveyer, for example, may be cleaned and lubricated, in which a gaseous fluid, such as air or flue gas, is employed both for cleaning the bearings and for delivering a lubricant to them.

In carrying out the foregoing object, it is another object of the invention to utilize the mechanism by which the bearings are cleaned and lubricated as a means for indicating the position of the shaft within the conveyer casing.

It is still another object of the invention to provide an improved mechanism for indicating the position of a shaft within a housing.

Other objects of the invention will appear hereinafter, the novel features and combinations being set forth in the appended claims.

This application is a division of my co-pending application, Serial No. 700,928, filed October 3, 1946, and now Patent No. 2,570,363 granted October 9, 1951, for a Bucket Elevator. It is to be understood that the construction and operation of the apparatus of this application follows that of my parent application above identified, and that only the subject matter pertinent to the present invention is described herein in detail.

Figure 1:
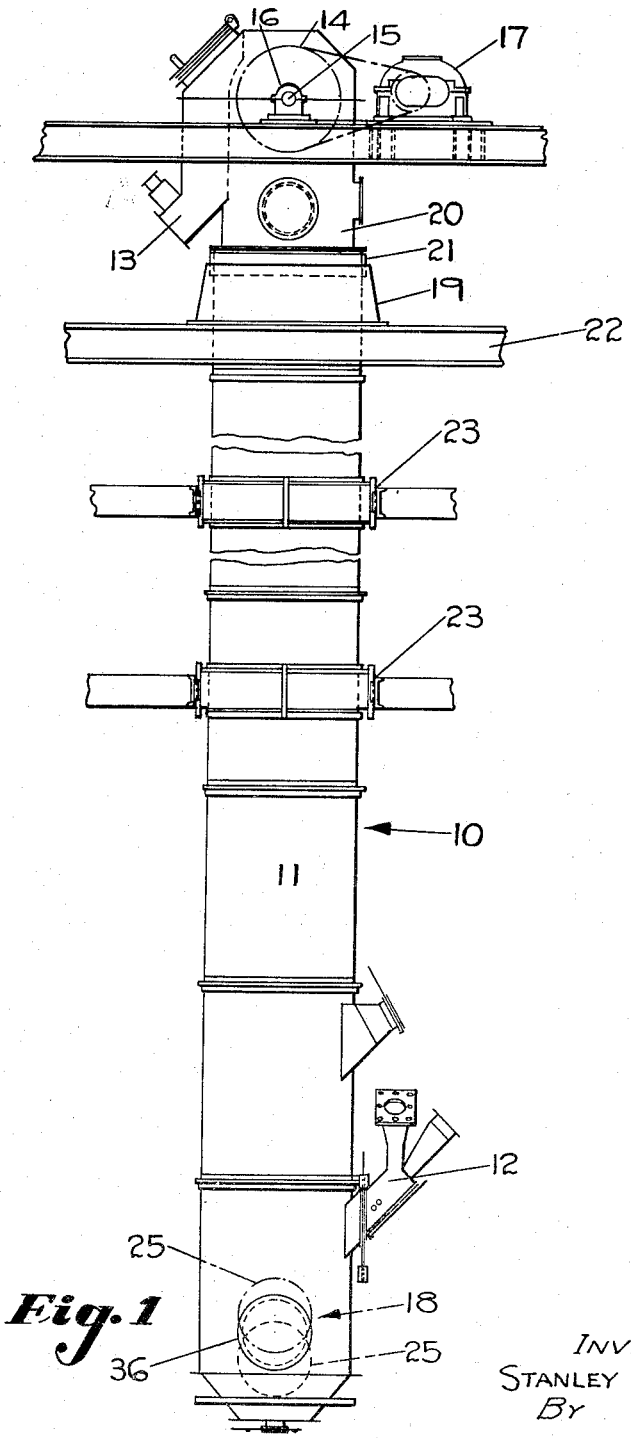
Fig. 1 is a side elevational view, with parts omitted, of a hot catalyst elevator or conveyer in which the invention is employed with particular advantage.

In Fig. 1 there is illustrated an elevator or conveyer 10 that is employed for elevating or conveying upwardly hot catalyst material that is fed into the elevator housing or casing 11 through a feed chute 12. Catalyst is fed into the elevator housing or casing 11 through a chute 12 adjacent the bottom thereof. The catalyst flowing into the elevator housing or casing 11 is received by buckets of a chain and bucket conveyer apparatus, not shown, and is conveyed upwardly and discharged from the housing or casing 11 through a discharge chute 13 at the top thereof. The chains of the conveyer mechanism travel over, and are driven by, a head shaft assembly including spaced wheels, one of which is indicated at 14 in Fig. 1 of the drawings. The wheels 14 are carried upon a shaft 15 supported on bearings 16, and shaft 15 is driven from a motor and speed reducing drive mechanism indicated at 17. Within the bottom of the housing or casing 11 there is a foot shaft assembly 18 around which the chains of the conveyer travel that is described in more detail hereinafter.

It may be mentioned that in the complete elevator unit the exterior surface of the housing or casing 11 includes a layer of insulating material which has not been shown in the drawings. This is because of the fact that the catalytic material is very hot, as a consequence of which there is a high temperature within the housing or casing 11 when the elevator is in operation. Because of the temperature differences which exist within the housing or casing 11 when it is in operation, as compared with when it is shut down, and particularly in view of the fact that the casing has appreciable height—for example, in one installation it is approximately one hundred seventy-five feet high; it is necessary to provide for the free expansion and contraction of said housing or casing 11, particularly along its length.

The supporting or suspending mechanism for the housing or casing 11 is in the form of a peripheral frusto-conical petticoat, skirt or flange 19 which is located near the top of said elevator and adjacent the bottom of the head section 20 thereof. The top of the skirt 19 is rigidly attached, as by welding, preferably around its entire periphery, to a supporting and reinforcing ring or belt 21, which in turn is rigidly attached to and forms a reinforcement of the periphery of the housing or casing 11. The bottom of skirt 19 rests upon a supporting superstructure 22 which may include a pair of spaced I-beams and interconnecting cross-beams which form a part of, or are attached to, a building or other independent supporting structure.

The entire load or weight of the housing or casing 11 is supported by the superstructure 22 through the skirt 19 and ring 21. In view of the height of the casing 11, guide means 23 are provided at spaced vertical intervals to guide and brace the casing 11 against excessive lateral movement, which, for example, may be caused by the wind, since in most installations these elevators or conveyers are built outdoors and are supported merely by open frames, of which the superstructure 22 is a part.

Figure 2:
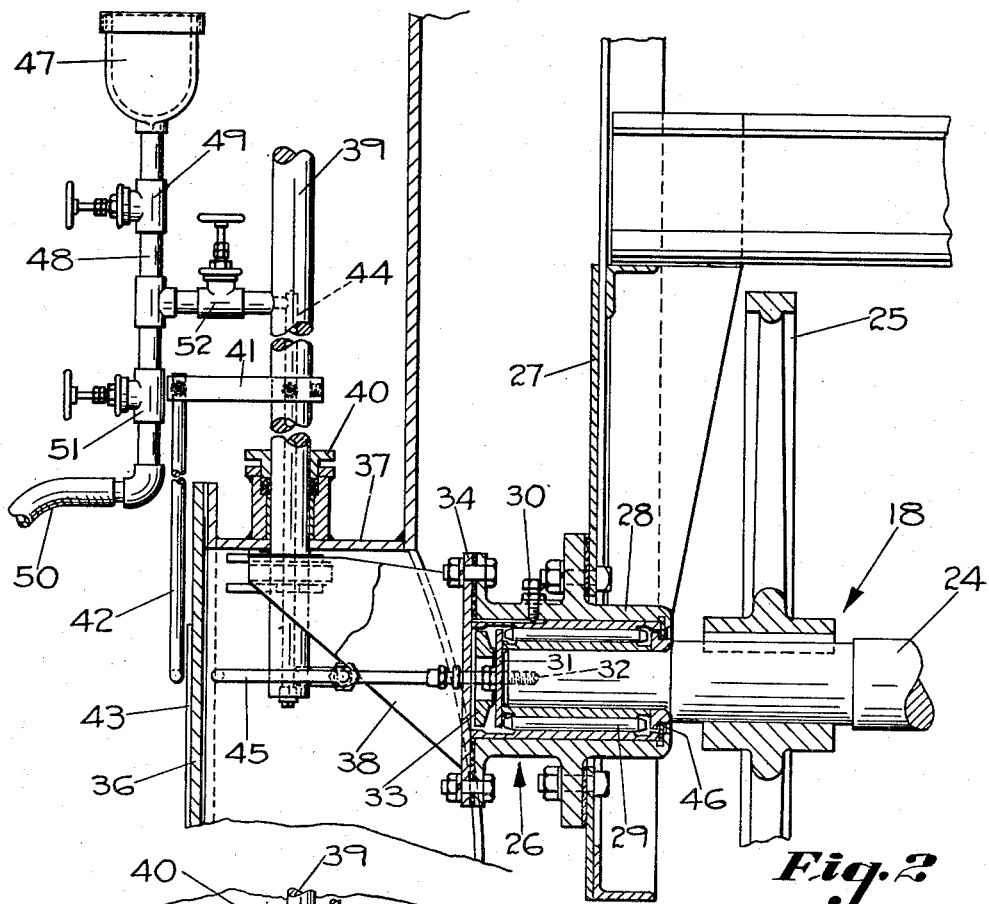
Fig. 2 is a sectional elevational view on a larger scale showing the foot shaft and associated mechanism of the elevator and conveyer seen in Fig. 1.

Attention is now directed to Fig. 2 of the drawings and to the structure of the foot shaft assembly 18 and its associated mechanism. As indicated in Fig. 1 of the drawings, the foot shaft assembly 18 is in the bottom of the elevator housing or casing 11. Fig. 2 shows one side only of the foot shaft assembly 18, it being understood that the opposite side is identical to the side shown. Foot shaft assembly 18 includes a foot shaft 24 provided with spaced wheels 25 adjacent opposite ends thereof which receive and guide the chains of the bucket elevator mechanism, the knuckles of said chains contacting the peripheries of the wheels 25 and the side strips thereof overlapping the wheel rims. Opposite ends of the shaft 24 are supported in roller bearings 26 which are carried in a floating framework 27. The framework 27 is mounted for free vertical or up-and-down movement in a plane while being restrained against all other movement, by a mechanism not herein shown but which is fully shown and described in my parent application, Serial No. 700,928, now Patent No. 2,570,363, above identified.

Figure 3:
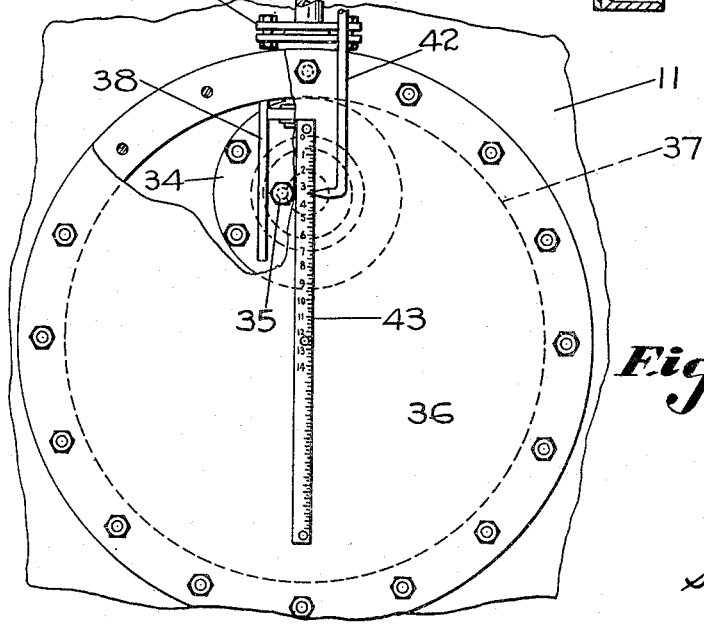
Fig. 3 is a view on a larger scale showing a portion of the casing adjacent the foot shaft, and the shaft position indicator mechanism.

The details of the bearings 26 can be seen by reference to Fig. 2 of the drawings, the other bearing and associated mechanism being of substantially identical construction. Each said bearing 26 includes a block, casting or shell 28 removably bolted to frame 27 and roller bearings 29 which include inner and outer races mounted on the shaft 24 and casting 28, respectively. A set screw 30 holds the outer race against rotation. A disc or plate 31 is attached by screw means 32 to the end of shaft 24 and holds the inner race of the bearing 26 in place. A thrust washer 33 is interposed between the disc 31 and a removable cover plate or cap 34 for the casting 28. Thrust washer 33 is held against rotation and can be adjusted toward and from the disc 31 by a pair of set screws that extend into recesses in the washer 33, one of which set screws is seen at 35 in Fig. 3 of the drawings.

It is to be particularly noted that the shaft 24 and the bearings 26 are entirely within the casing 11, as a consequence of which there is no need for cooling said shaft 24 since it and the bearings 26 are subject to substantially the same temperature. Furthermore, this eliminates all of the normally present intricate mechanism involved providing a seal between the shaft 24 and the casing 11 which would otherwise be necessary to retain the totally enclosing characteristic of said casing 11. Access to the bearings 26 and associated mechanism is provided by removable circular or disc-like cover plates 36, there being one such cover plate adjacent each side of the casing, or, in other words, adjacent each end of the shaft 24. These cover plates are provided on the ends of projecting drums 37 which are formed near the bottom of the foot section of the elevator 10.

In order to indicate the position of the shaft 24 at all times and also to provide means for keeping the bearings 29 free of grit, dirt, foreign material, catalyst dust or the like and preferably simultaneously to lubricate them, I provide mechanism which will now be described. Each bearing cover plate 34 is provided with a bracket 38 which extends into a drum 37 and is attached to the bottom of a drilled rod 39. Drums 37, as indicated particularly in Fig. 2 of the drawings, are preferably an integral part of the housing or casing 11. Rod 39 lies in the plane of motion of the foot shaft 24 and extends through the top of drum 37 through a stuffing box 40 and carries an outwardly extending arm 41 which in turn carries a downwardly extending pointer or indicator arm 42 which cooperates with indicia on indicating scale 43 carried on the plate 36. This pointer arm 42 at all times indicates the position of the adjacent end of the shaft 24. The rod 39 is partially drilled or bored as indicated by bore 44 and adjacent its bottom is connected by a flexible tube 45 which is preferably coiled about the rod 39 and communicates with the bore 44, said tube 45 leading through a fitting provided in a hole located centrally in plate 34 so that a gaseous fluid, such as air, flue gas, or the like, may be introduced under pressure into the bearing 26. Such fluid will create pressure within the bearing 26 and flow inwardly therethrough through a non-positive seal 46, thus acting to prevent the entry of foreign material into the bearing and to blow out any grit or abrasive material or any other foreign matter which may have worked past the seal 46.

In addition to cleaning out and maintaining the bearing 26 free of foreign substances, it is possible to lubricate it by utilizing the flowing fluid as a carrier medium for a lubricant. To this end a graphite pot or receptacle 47 is provided which is connected to the bore 44 through pipe 48 and control valve 49, the previously mentioned source of fluid pressure being derived by pipe or conduit 50 and control valve 51. A control valve 52 is interposed between valves 49 and 51 and the bore 44. If control valve 49 is closed and valves 51 and 52 open, it is evident that cleaning fluid or gas will be delivered to the bearing 26. If valve 51 is closed and valve 49 is open, lubricating material, such as graphite, oil or the like, will be delivered to the pipe leading from valve 51 and some of it may find its way into bore 44. Thereafter, when valve 49 is closed and valves 51 and 52 are both open, any such graphite or lubricating material will, of course, be carried by the flowing fluid to lubricate the bearing 26. If valve 52 is closed, all access to the bore 44 is shut off.

It is thus evident that the position of the shaft 24 at each side of the elevator may be determined at all times by visual indication outside the elevator casing, that the shaft 24 and associated bearings are totally enclosed, and that they may be cleaned and lubricated or just cleaned without opening the enclosing casing 11, as a consequence of which they may be cleaned and lubricated and then maintained clean while the unit is in operation.

It is also apparent that this invention provides a mechanism that has a triple function, namely: that of indicating the position of a shaft housed within a casing which may be, for example, the casing of an elevator or conveyer; that of cleaning by blowing out the bearings of the shaft, and that of lubricating the bearings by blowing into them a lubricant which in practice is graphite.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A conveyer including a casing, conveyer means therein including a shaft bodily movable in one plane, bearing means within said casing for said shaft, means for indicating the position of said shaft in said casing including a member extending through said casing and movable in said plane, means connecting said member to said bearing for causing said member to follow the movements of said shaft, indicator means carried by said member, and indicator means carried by said casing, said indicator means cooperating to indicate the position of said shaft within said casing.

2. A conveyer including a casing, conveyer means therein including a shaft bodily movable in one plane, bearing means within said casing for said shaft, means indicating the position of said shaft in said casing including a member extending through said casing and movable in said plane, and means connecting said member to said bearing for causing said member to follow the movements of said shaft.

References Cited in the file of this patent

UNITED STATES PATENTS

| Number | Name | Date |
|---|---|---|
| 1,893,995 | Jung | Jan. 10, 1933 |
| 2,332,659 | Musschoot | Oct. 26, 1943 |
| 2,334,942 | Malone | Nov. 23, 1943 |
| 2,491,899 | Mercier | Dec. 20, 1949 |
| 2,588,864 | Mercier | Mar. 11, 1952 |

FOREIGN PATENTS

| Number | Country | Date |
|---|---|---|
| 24,454 | Great Britain | Nov. 13, 1908 |
| 818,338 | France | June 14, 1937 |